(12) United States Patent
Gu

(10) Patent No.: US 9,820,583 B1
(45) Date of Patent: Nov. 21, 2017

(54) BED WITH CANOPY

(71) Applicant: Zhejiang Yotrio Group Co., Ltd., Linhai (CN)

(72) Inventor: Zubin Gu, Linhai (CN)

(73) Assignee: ZHEJIANG YOTRIO GROUP CO., LTD., Linhai (CN)

( * ) Notice: Subject to any disclaimer, the term of this patent is extended or adjusted under 35 U.S.C. 154(b) by 0 days.

(21) Appl. No.: 15/466,927

(22) Filed: Mar. 23, 2017

(51) Int. Cl.
*A47C 29/00* (2006.01)
*A47C 20/04* (2006.01)
*A47C 21/00* (2006.01)
*H02J 7/02* (2016.01)
*H02S 40/38* (2014.01)
*H02S 20/30* (2014.01)
*H02J 7/35* (2006.01)

(52) U.S. Cl.
CPC .......... *A47C 29/003* (2013.01); *A47C 20/043* (2013.01); *A47C 21/003* (2013.01); *H02J 7/025* (2013.01); *H02J 7/355* (2013.01); *H02S 20/30* (2014.12); *H02S 40/38* (2014.12)

(58) Field of Classification Search
CPC ......... A47C 29/003; A47C 1/14; A47C 1/143; E04H 15/324; A47D 7/00; A61G 7/015
See application file for complete search history.

(56) References Cited

U.S. PATENT DOCUMENTS

| 1,218,519 | A | * | 3/1917 | Bradley | A61G 7/015 |
| | | | | | 280/32.6 |
| 5,718,254 | A | * | 2/1998 | Murphy | A47C 29/003 |
| | | | | | 135/115 |
| 8,002,349 | B1 | * | 8/2011 | Pizzuto | A47C 1/143 |
| | | | | | 297/184.11 |
| 2013/0143480 | A1 | * | 6/2013 | Trevelyan | A47C 21/044 |
| | | | | | 454/284 |

* cited by examiner

*Primary Examiner* — Eric J Kurilla
(74) *Attorney, Agent, or Firm* — Perkins Coie LLP

(57) ABSTRACT

A bed with canopy, including a canopy, a bed, a solar energy converter, a power storage device, a controller, and a power consumer device is described herein. The bed is disposed below the canopy. The solar energy converter is disposed on the canopy. The power storage device, the contoller are electrically connected with the solar energy converter The power consumer device is electrically connected with the power storage device. The bed with canopy of the present invention not only remains the shielding function of the canopy and the lying or sitting function of the bed, but also a charging device utilizing solar energy is added for powering a power consumer device, the power consumer device is used cooperatively with electronic products to realize diversified functions of the electronic products such that more functions is expanded to meet the needs of users on diversified products.

14 Claims, 4 Drawing Sheets

BED WITH CANOPY

BACKGROUND OF THE INVENTION

Field of the Invention

The present invention belongs to a technical field of outdoor applications and, more particularly, relates to a bed with canopy.

Description of the Related Art

Both canopy and outdoor bed are common outdoor applications, the conventional canopy is unitarily functioned only as shielding the wind and rain as well as the sun, while also the outdoor bed is unitarily functioned only as being lay and seated. In outdoor, the canopy is usually combined with the outdoor bed for the convenience of people, i.e. a bed with canopy is offered to people, however, the conventional bed with canopy is a simple combination of a canopy with a bed. The canopy is only unitarily functioned as a shelter and the bed is only functioned as being lay and seated, thereby the needs of users on a diversified product can't be met.

BRIEF SUMMARY OF THE INVENTION

The objective of the present invention is to solve the above problem by means of providing a bed with canopy, which not only remains the shielding function of the canopy and the lying or sitting function of the bed, but also a charging device utilizing solar energy is added for powering a power consumer device, the power consumer device is used cooperatively with electronic products to realize diversified functions of the electronic products such that more functions is expanded to meet the needs of users on diversified products.

To achieve above objective, the present invention provides a bed with canopy, including a canopy, a bed, a solar energy converter, a power storage device, a controller, and a power consumer device. The bed is disposed below the canopy. The solar energy converter is disposed on the canopy for receiving solar energy and converting the solar energy into electrical energy. The power storage device is electrically connected with the solar energy converter and disposed at the bed or the canopy. The controller is electrically connected with the solar energy converter and the power storage device respectively. The controller captures electricity signal of the power storage device and controls whether the solar energy converter is operated based on the electricity signal. When the solar energy converter is operating, the solar energy is converted into the electrical energy, and the electrical energy is stored in the power storage device. The power consumer device is electrically connected with the power storage device and is powered by the power storage device. The power consumer device is mounted at the bed or the canopy.

In one embodiment of the present invention, the canopy may include a pillar, a roof frame and a top canopy, the roof frame may be disposed at an upper end of the pillar, the bed may be disposed at a lower end of the pillar, and the top canopy may be movably disposed at the roof frame.

In one embodiment of the present invention, the top canopy may include a sliding bar and a tarpaulin, the tarpaulin may be connected with the sliding bar, two ends of the sliding bar may have pulleys, the roof frame may have sliding grooves, and the pulleys may be fitted in the sliding grooves and movably cooperated with the sliding grooves.

In one embodiment of the present invention, the roof frame may have mounting openings communicated with the sliding grooves.

In one embodiment of the present invention, the canopy may further include a roof bar disposed at the roof frame, the solar energy converter may include a solar energy chip, and the solar energy chip may be disposed at the roof bar.

In one embodiment of the present invention, the bed may include a bed frame, a fixed plate, an movable plate and a supporting bar. The fixed plate may be fixedly mounted to the bed frame, the movable plate may be articulated to the bed frame, the supporting bar may be articulated to a back of the movable plate to support the movable plate, and the frame may have at least one engaged groove for cooperating with a free end of the supporting bar.

In one embodiment of the present invention, the supporting bar may be U-shaped, and the bed frame may have at least one pair of engaged grooves.

In one embodiment of the present invention, the frame may have several pairs of engaged grooves along a longitudinal direction of the bed frame, and the movable plate appears in different angle when the supporting bar is engaged into different pairs of engaged grooves.

In one embodiment of the present invention, the engaged groove may have two oppositely converging hooks.

In one embodiment of the present invention, the frame may have supporting blocks, and the supporting blocks are disposed correspondingly to two sides of the movable plate.

In one embodiment of the present invention, the power consumer device may include a WiFi signal enhancer disposed at the bed.

In one embodiment of the present invention, the power consumer device may include a USB interface disposed at the bed.

In one embodiment of the present invention, the power consumer device may include a wireless charging device disposed at the bed.

In one embodiment of the present invention, the power consumer device may include a LED lamp disposed at the canopy.

In one embodiment of the present invention, the power consumer device may include an acoustic disposed at the canopy or the bed.

In one embodiment of the present invention, the bed with canopy may further include an emergency charging interface electrically connected with the power storage device and disposed at the bed.

Compared with the prior art, the bed with awing of the present invention has the beneficial effects.

The bed with canopy of the present invention includes the solar energy converter and the power storage device, the bed with canopy utilizing directly the solar energy to generate electricity can power for the power consumer device, and the power consumer device can cooperatively be used with electronic products, thereby diversified functions of the electronic products is realized, so that various functions is expanded to meet the needs of users on the multi-functional products.

The power consumer device includes the WiFi signal enhancer, the USB interface and the wireless charging device, so that the bed of the present invention offers a function of WiFi signal enhancement for electronic products, a function of powering for the USB interface and a function of wireless charging, all of the functions are diversified to bring more convenience for users.

The power consumer device also includes a LED lamp to provide illumination for users employing conveniently under a condition of lower brightness.

The bed with canopy of the present invention has an emergency charging interface to deal with the problem that the solar energy can't be utilized for generating electricity.

The canopy can be movable, so that the canopy is convenient to use and the users can select whether to open the top canopy according to the requirements of themselves.

The movable plate of the bed can be rotated to tilt in different angles, so that the users can not only lie flat or recline on the bed, but also can choose different reclining angles to meet various personalized requirements.

DETAILED DESCRIPTION OF THE INVENTION

Figure 1:
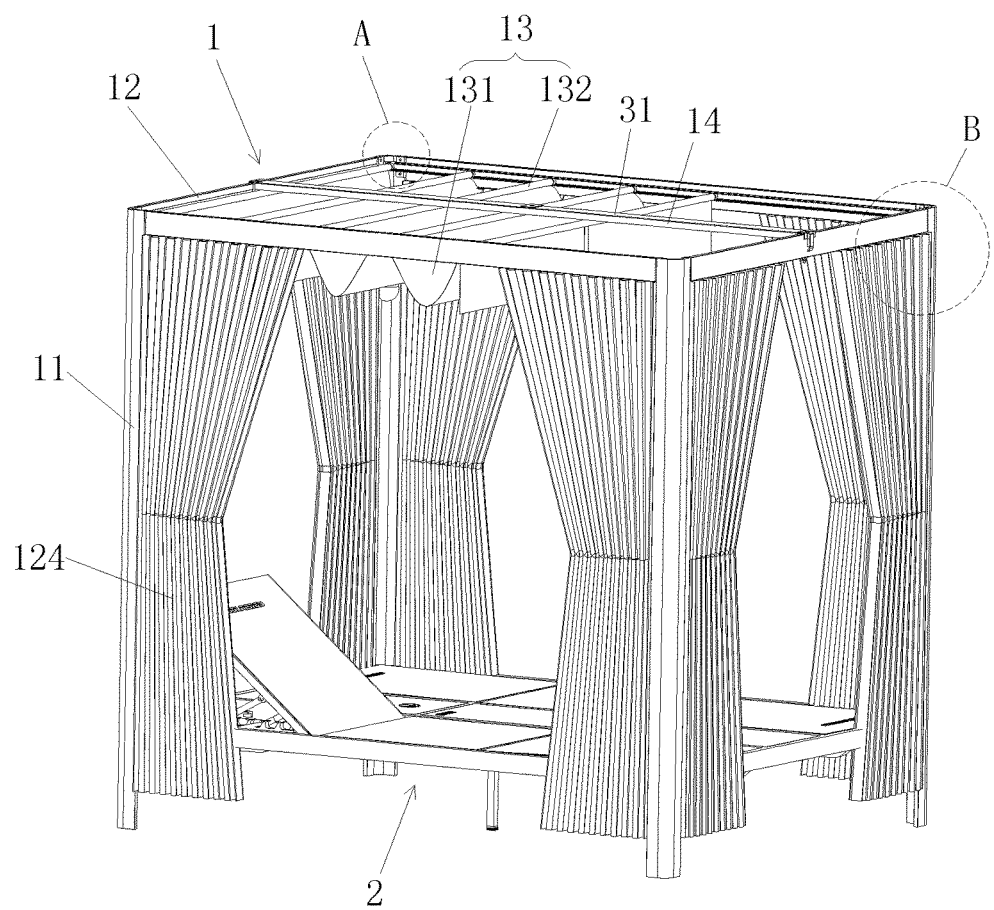
FIG. 1 is a structural schematic view showing a bed with canopy according to one embodiment of the present invention.
Figure 2:
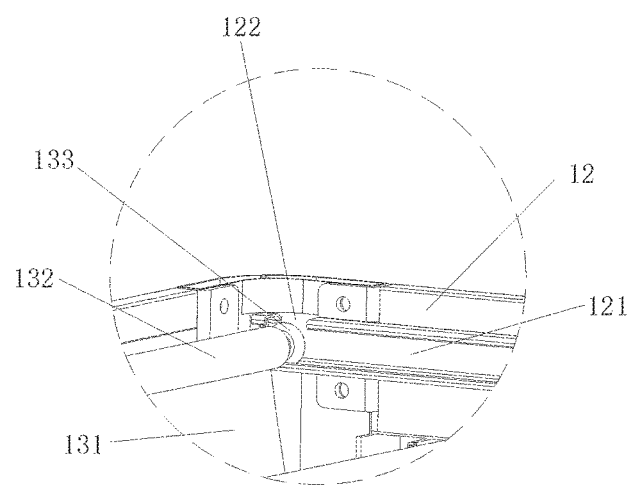
FIG. 2 is a partial enlarged view of A in FIG. 1.
Figure 3:
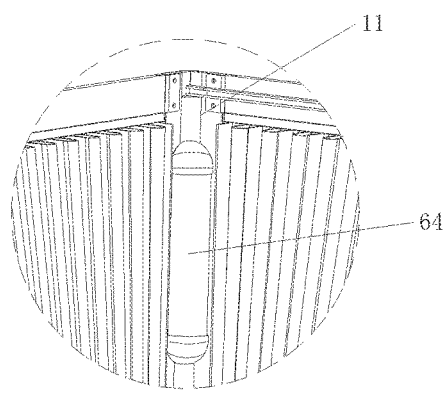
FIG. 3 is a partial enlarged view of B in FIG. 1 seen from another angle.
Figure 4:
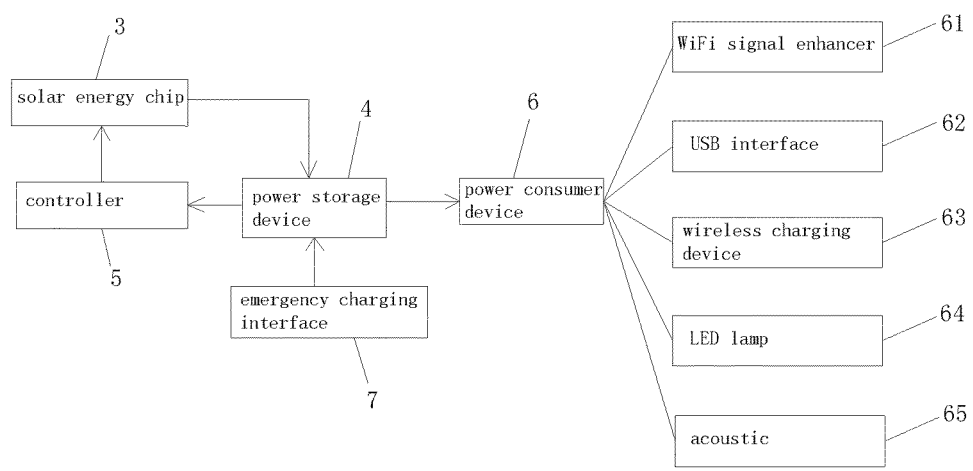
FIG. 4 is a structural schematic view showing a circuit system of the bed with canopy according to one embodiment of the present invention.
Figure 5:
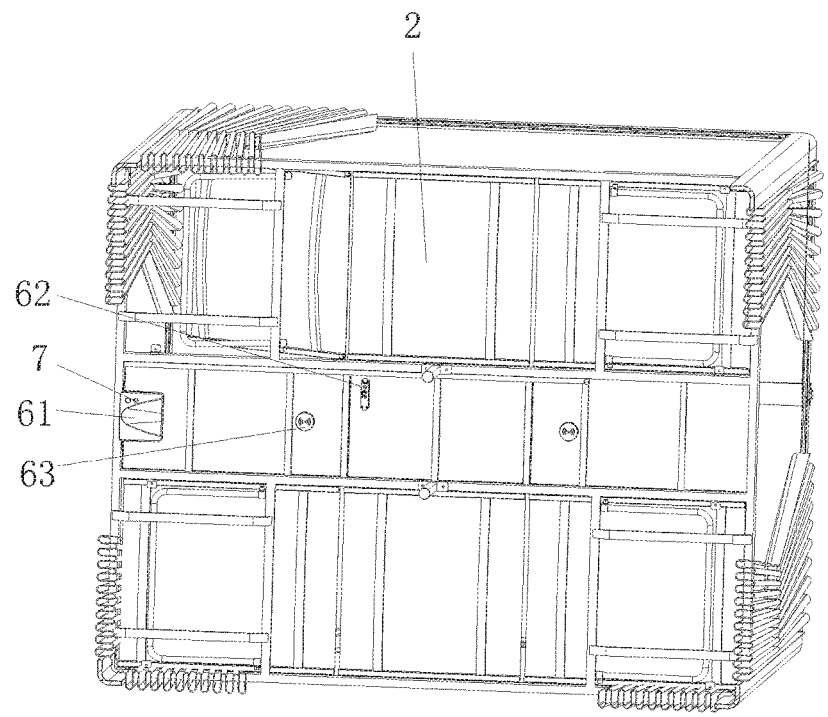
FIG. 5 is a bottom structural schematic view showing the bed with canopy according to one embodiment of the present invention.

To make the above-mentioned and other purposes, features and advantages of the present invention better understood, preferred embodiments will be described in detail below in combination with the accompanying drawings.

As shown in FIG. 1 to FIG. 8, a bed with canopy includes a canopy 1, a bed 2, a solar energy converter 3, a power storage device 4, a controller 5, and a power consumer device 6. The bed 2 is disposed below the canopy 1. Users can have relaxation and entertainment when lying on the bed 2, and the bed 2 provides shielding. The solar energy converter 3 is disposed on the canopy 1 for receiving solar energy and converting the solar energy into electrical energy. The power storage device 4 is electrically connected with the solar energy converter 3 and disposed at the bed 2 or the canopy 1. The controller 5 is electrically connected with the solar energy converter 3 and the power storage device 4. The controller 5 captures an electricity signal of the power storage device 4 and controls whether the solar energy converter 3 is operated based on the electricity signal. When the solar energy converter 3 is operating, the solar energy is converted into the electrical energy, and the electrical energy is stored in the power storage device 4. When using outdoors in daytime, the controller 5 can have a determination according to electricity in the power storage device 4. When the electricity in the power storage device 4 is not full, a control signal is outputted by the controller 5 to initiate an operation of the solar energy converter 3 for the solar energy converter 3 converting solar energy into electrical energy, and the electrical energy is stored in the power storage device 4. When the electricity in the power storage device 4 is full, a control signal is outputted by the controller 5 to stop the operation of the solar energy converter 3 for the solar energy converter 3 not generating electrical energy any more (i.e. stopping powering for the power storage device 4) such that the power storage device 4 is protected.

The power consumer device 6 is electrically connected with the power storage device 4, and the power consumer device 6 is powered by the power storage device 4. The power consumer device 6 is mounted at the bed 2 or the canopy 1. As the bed with canopy of the present invention includes the solar energy converter 3 and the power storage device 4 for utilizing directly the solar energy to generate electricity for the power consumer device 6, and the power consumer device 6 can cooperatively be used with electronic products, thereby diversified functions of the electronic products is realized, so that various functions is expanded to meet the needs of users on the multi-functional products.

In one embodiment, the power consumer device 6 includes a WiFi signal enhancer 61 disposed at the bed 2. A received weak WiFi signal source may be enhanced by the WiFi signal enhancer 61 to be used conveniently by users. The WiFi signal enhancer 61 being mounted at the bed 2 may save space and be easy to use. In one embodiment, the WiFi signal enhancer 61 may be mounted at a back of the bed 2 for remaining an aesthetical appearance of a front of the bed 2 without affecting people lying on the bed while preferable signal may be provided. However, this invention is not limited thereto. The WiFi signal enhancer 61 may also be mounted at other places of the bed 2 or at the canopy 1.

In one embodiment, the power consumer device 6 includes a USB interface 62 disposed at the bed 2. The USB interface 62 may serve as a charging interface of electronic device (e.g. cellphone), a cellphone may be charged when connecting with the charging interface, and it is very convenient for users to use outdoors. In one embodiment, the USB interface 62 may be disposed at a back of the bed 2 for remaining an aesthetical appearance of a contour of the bed 2, also without affecting the utilization of the bed 2, and it is convenient for users to use. In another embodiment, the USB interface 62 may be disposed at the front of the bed 2, the electronic product may be charged by users while lying on the bed 2, which makes use more convenient.

In one embodiment, the power consumer device 6 includes a wireless charging device 63 disposed at the bed 2. The wireless charging device 63 may power for electronic products. The wireless charging device 63 having a wireless charging transmitting end may employ inductive coupling technique to provide a stable charging current for the electronic products having wireless charging receiving end, it is very convenient that the electronic products can be charged when being close to the wireless charging transmitting end. In one embodiment, the wireless charging transmitting end of the wireless charging device 63 is disposed at the front of the bed 2, it is convenient to use that the electronic products may be directly charged by being disposed at the wireless charging transmitting end.

In one embodiment of the present invention, the power consumer device includes a LED lamp 64 disposed at the canopy 1. The LED lamp 64 is electrically connected with the power storage device 4, the LED lamp 64 is powered by the power storage device 4, and users can still employ the bed 2 normally and relax and entertain on the bed 2 by turning on the LED lamp 64 when in rainy days or under such outdoor conditions with lower brightness as night. Moreover, the LED lamp 64 is externally covered by a PC lamp housing such that a soft atmosphere illumination may be provided for users to have a more comfortable experience.

In one embodiment of the present invention, the power consumer device includes an acoustic 65. The acoustic 65 may be disposed at the canopy 1, such as disposed in the PC lamp housing. However, this invention is not limited thereto. The acoustic 65 may be disposed at the bed 2 in another embodiment.

The bed with canopy further includes an emergency charging interface 7 electrically connected with the power storage device 4, and the emergency charging interface 7 is disposed at the bed 2. When the electricity can't be generated by utilizing the sunlight, such as in continuous rainy days, the emergency charging interface 7 may be utilized to power for the power storage device 4 such that a normal power supply from the power storage device 4 to the power consumer device 6 may be assured, allowing users not to be affected by rainy weather by using the bed with canopy in the present invention.

The canopy 1 includes a pillar 11, a roof frame 12 and a top canopy 13. The roof frame 12 is disposed at an upper end of the pillar 11, the bed 2 is disposed at a lower end of the pillar 11, and the top canopy 13 is movably disposed at the roof frame 12. The top canopy 13 can provide a shelter for the bed 2. A shielding area of the top canopy 13 may be altered by sliding the top canopy 13 to different positions since the top canopy 13 is movably disposed at the roof frame 12.

The top canopy 13 includes a sliding bar 132 and a tarpaulin 131. The tarpaulin 131 is connected with the sliding bar 132, two ends of the sliding bar 132 have pulleys 133, the roof frame 12 has sliding grooves 121, and the pulleys 133 are fitted in the sliding grooves 121 and movably cooperated with the sliding grooves 121. The tarpaulin 131 covering a whole roof frame 12 may be gathered to one side of the roof frame 12 by directly pushing the tarpaulin 131 and the sliding bar 132, similarly, the tarpaulin 131 gathered at one side of the roof frame 12 may also be pulled to cover the whole roof frame 12. In the embodiment, a plurality of sliding bars 132 are connected to one piece of tarpaulin 131, and the tarpaulin 131 is stitched with a strip, since the strip sags to a position accessible to hands, it is very convenient to uncover or furl the tarpaulin 131 only by pulling the strip.

The roof frame 12 has mounting openings 122, and the mounting openings 122 are communicated with the sliding grooves 121. When assembling, the pulleys 133 at the two ends of the sliding 132 are mounted into the sliding grooves 121 from the mounting openings 122. The mounting openings 122 are upward, and the simple structure of the mounting openings 122 makes assembly easy.

The canopy 1 further includes a roof bar 14 disposed at the roof frame 12. The solar energy converter 3 includes a solar energy chip 31, and the solar energy chip 31 disposed at the roof bar 14. The solar energy chip 31 may be disposed above the tarpaulin 131 to be not shielded by the tarpaulin 131 for receiving sunlight maximally. The solar energy chip 31 may adopt single crystalline silicon or photovoltaic film.

Figure 6:
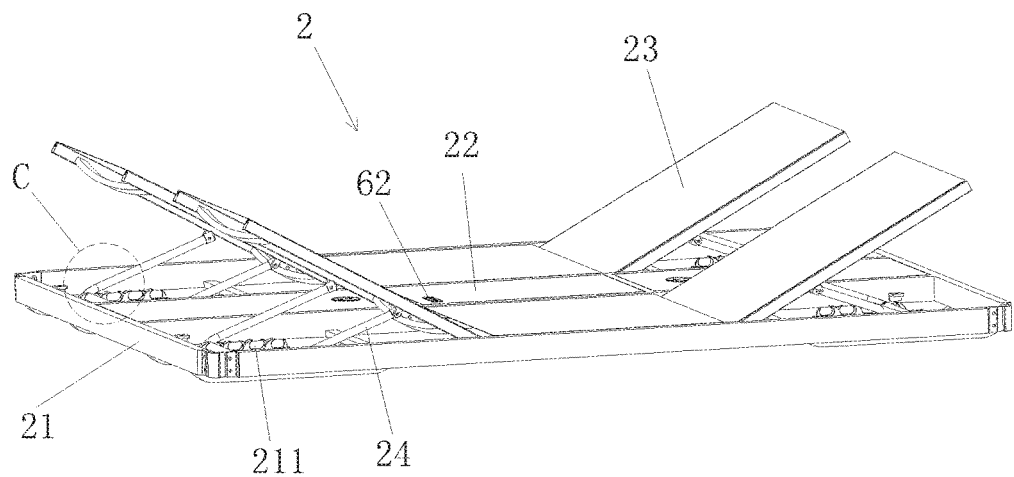
FIG. 6 is a structural schematic view showing a bed of the bed with canopy according to one embodiment of the present invention.
Figure 7:
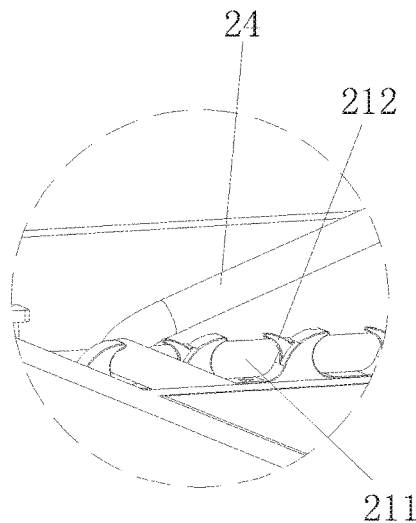
FIG. 7 is a partial enlarged view of C in FIG. 6.
Figure 8:
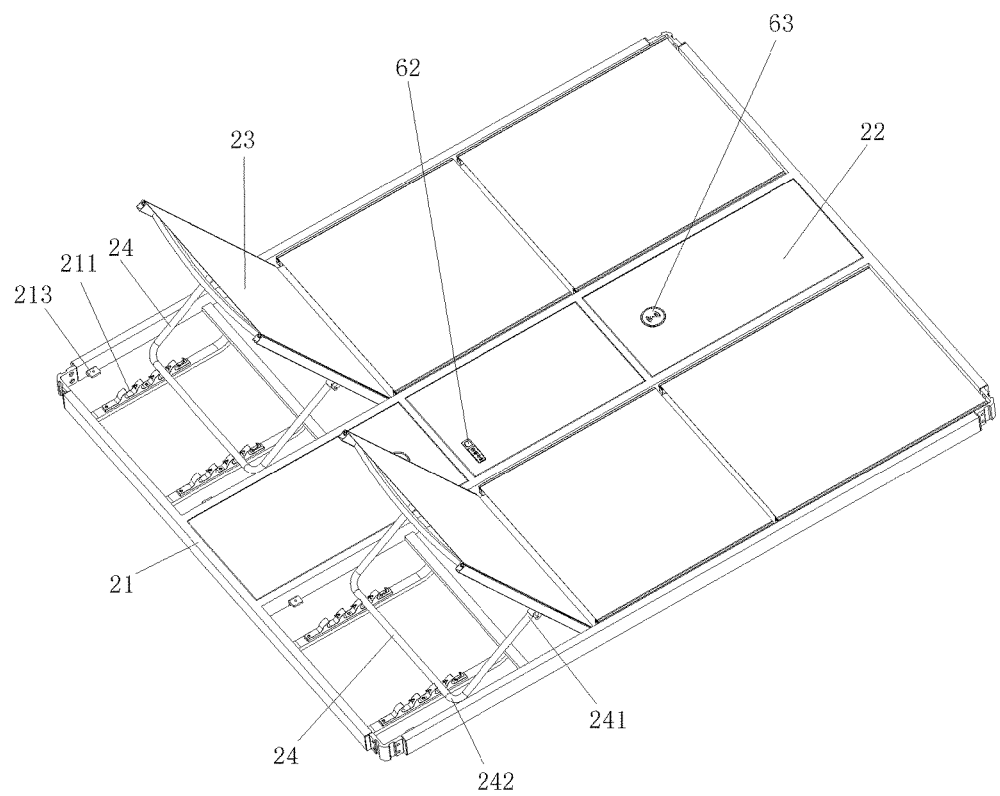
FIG. 8 is a structural schematic view showing the bed in FIG. 6 in another condition.

As shown in FIG. 6, the bed 2 includes a bed frame 21, a fixed plate 22, an movable plate 23 and a supporting bar 24. The fixed plate 22 is fixedly mounted to the bed frame 21, the movable plate 23 is articulated to the bed frame 21, and the supporting bar 24 is articulated to a back of the movable plate 23 to support the movable plate 23. The bed frame 21 has at least one engaged groove 211 for cooperating with a free end of the supporting bar 24. As shown in FIG. 8, an end of the supporting bar 24 articulated to the movable plate 23 is an articulated end 241, and an end away from the articulated end 241 is a free end 242. The supporting bar 24 may be rotated to engaged into the engaged groove 211, and then the movable plate 23 is supported by the supporting bar 24 to make the movable plate 23 appears under tilting condition for people reclining on the bed 2. The supporting bar 24 may also be withdrawn from the engaged groove 211 to fold on the back of the movable plate 23, then the movable plate 23 is rotated again to align with the fixed plate 22 for people lying flat on the bed 2. As the movable plate 23 and the supporting bar 24 are disposed, the bed 2 of the present invention may be lied flat and reclined, providing many selections to users and is more able to meet the diversified requirements of users.

In the embodiment, the bed 2 has four movable plates 23, so that users have various selections of supporting different movable plates 23 from different directions. However, this invention is not limited thereto. In other embodiments, the bed 2 may only include one piece of movable plate 23 or two pieces of movable plates 23, the present invention is not limited to this. In the embodiment, the movable plates 23 are disposed at four corners of the frame 21, and the fixed plate 22 is disposed among the movable plates 23. The WiFi signal enhancer 61, the USB interface 62, the wireless charging device 63 and the emergency charging interface 7 are all disposed at the fixed plate 22.

The supporting bar 24 is U-shaped, so that two ends of the supporting bar 24 are articulated to the movable plate 23, and the two ends of the supporting bar 24 being articulated to the movable plate 23 are the articulated ends 241. A middle portion of the supporting bar 24 is the free end 242. The frame 21 has at least one pair of engaged grooves 211. The middle portion of the supporting bar 24 is engaged into one of pairs of the engaged grooves 211, so that it is more stable when the supporting bar 24 is supporting the movable plate 23. In the embodiment, the bed frame 21 has several pairs of engaged grooves 211 along a longitudinal direction of the bed frame 21. The movable plate 23 appears in different angle when the supporting bar 24 is engaged into different pairs of engaged grooves 211. Users may choose to make the supporting bar 24 engage into different pairs of the engaged grooves 211 according to their requirements, so that the users may recline in different angles, such as 10 degree, 15 degree, 20 degree, or other. Disposing several pairs of engaged grooves 211 provides the users with many selections for meeting different requirements of different users.

The engaged groove 211 has two oppositely converging hooks 212. The hooks 212 can be a limitation for the supporting bar 24 and prevent the supporting bar 24 from sliding from the engaged groove 211.

The frame 21 has supporting blocks 213, and the supporting blocks 213 are disposed correspondingly to two sides of the movable plate 23. When the movable plate 23 is rotated to align with the fixed plate 22, the movable plate 23 is supported by the supporting blocks 213. A top face of the supporting block 213 is above the engaged groove 211, so that the movable plate 22 is prevented from pressing on the engaged groove 211 when the movable plate 23 is keeping flat.

The bed further includes cord fabrics 214 disposed at sides of the bed frame 21, and the cord fabrics 214 shield from the sides of the bed 2.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A bed assembly, comprising:
   a canopy;
   a bed, disposed below the canopy;
   a solar energy converter, disposed on the canopy for receiving solar energy and converting the solar energy into electrical energy;
   a power storage device, electrically connected with the solar energy converter and disposed at the bed or the canopy;
   a controller, electrically connected with the solar energy converter and the power storage device;
   wherein the controller captures an electricity signal of the power storage device and controls whether the solar energy converter is operated based on the electricity signal, when the solar energy converter is operating, the solar energy is converted into the electrical energy, and the electrical energy is stored in the power storage device; and
   a power consumer device, electrically connected with the power storage device and being powered by the power storage device, wherein the power consumer device is mounted at the bed or the canopy;
   wherein the canopy comprises a pillar, a roof frame and a top canopy, the roof frame is disposed at an upper end of the pillar, the bed is disposed at a lower end of the pillar, and the top canopy is movably disposed at the roof frame;
   wherein the top canopy comprises a sliding bar and a tarpaulin, the tarpaulin is connected with the sliding bar, two ends of the sliding bar have pulleys, the roof frame has sliding grooves, and the pulleys are fitted in the sliding grooves and movably cooperated with the sliding grooves.

2. The bed assembly according to claim 1, wherein the roof frame has mounting openings communicated with the sliding grooves.

3. The bed assembly according to claim 1, wherein the canopy further comprises a roof bar disposed at the roof frame, the solar energy converter comprises a solar energy chip, and the solar energy chip is disposed at the roof bar.

4. The bed assembly according to claim 1, wherein the bed comprises a bed frame, a fixed plate, a movable plate and a supporting bar, the fixed plate is fixedly mounted to the bed frame, the movable plate is articulated to the bed frame, the supporting bar is articulated to a back of the movable plate to support the movable plate, and the bed frame has at least one engaged groove for cooperating with a free end of the supporting bar.

5. The bed assembly according to claim 4, wherein the supporting bar is U-shaped, and the bed frame has at least one pair of engaged grooves.

6. The bed assembly according to claim 5, wherein the bed frame has several pairs of engaged grooves along a longitudinal direction of the bed frame, and the movable plate appears in a different angle when the supporting bar is engaged into different pairs of engaged grooves.

7. The bed assembly according to claim 4, wherein each engaged groove has two oppositely converging hooks.

8. The bed assembly according to claim 4, wherein the frame has supporting blocks, and the supporting blocks are disposed correspondingly to two sides of the movable plate.

9. The bed assembly according to claim 1, wherein the power consumer device comprises a WiFi signal enhancer disposed at the bed.

10. The bed assembly according to claim 1, wherein the power consumer device comprises a USB interface disposed at the bed.

11. The bed assembly according to claim 1, wherein the power consumer device comprises a wireless charging device disposed at the bed.

12. The bed assembly according to claim 1, wherein the power consumer device comprises a LED lamp disposed at the canopy.

13. The bed assembly according to claim 1, wherein the power consumer device comprises a speaker disposed at the canopy or the bed.

14. The bed assembly according to claim 1, further comprising an emergency charging interface electrically connected with the power storage device and disposed at the bed.

* * * * *